(12) United States Patent
Ushiro et al.

(10) Patent No.: US 7,573,638 B2
(45) Date of Patent: Aug. 11, 2009

(54) DIFFRACTIVE OPTICAL ELEMENT AND METHOD OF ITS FORMATION

(75) Inventors: Toshihiko Ushiro, Itami (JP); Soichiro Okubo, Itami (JP); Takashi Matsuura, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/496,846

(22) PCT Filed: Aug. 25, 2003

(86) PCT No.: PCT/JP03/10722

§ 371 (c)(1),
(2), (4) Date: May 28, 2004

(87) PCT Pub. No.: WO2004/027464

PCT Pub. Date: Apr. 1, 2004

(65) Prior Publication Data

US 2006/0146408 A1      Jul. 6, 2006

(30) Foreign Application Priority Data

Sep. 19, 2002   (JP) .......................... 2002-273561

(51) Int. Cl.
*G02B 27/44*     (2006.01)
(52) U.S. Cl. ........................................ 359/566; 359/576
(58) Field of Classification Search .................. 359/569, 359/576, 484
See application file for complete search history.

(56) References Cited

U.S. PATENT DOCUMENTS

2002/0021723 A1   2/2002  Amako et al.
2003/0117706 A1   6/2003  Okubo et al.
2005/0152037 A1*  7/2005  Shiozaki et al. ............. 359/573

FOREIGN PATENT DOCUMENTS

| EP | 1184708 A2 | 3/2002 |
|---|---|---|
| JP | S61-213802 A | 9/1986 |
| JP | S62-071922 A | 4/1987 |
| JP | H04-104103 A | 4/1992 |
| JP | H05-181088 A | 7/1993 |
| JP | H05-273425 A | 10/1993 |

(Continued)

OTHER PUBLICATIONS

D. P. Dowling et al., "The use of refractive index as a measure of diamond-like carbon film quality," Diamond and Related Materials, 1998, vol. 7, pp. 432-434.

(Continued)

*Primary Examiner*—Joshua L Pritchett
(74) *Attorney, Agent, or Firm*—James W. Judge (57) ABSTRACT

Practical diffractive optical elements are made available efficiently and at low-cost. A refractive-index-modulated diffractive optical element includes a transparent DLC (diamond-like carbon) film (2) formed on a transparent substrate (1), with the DLC film (2) containing a diffraction grating having local regions (2a) of a relatively high refractive index and local regions (2) of a relatively low refractive index. The DLC film (2) can readily be deposited by plasma CVD onto the substrate (1), and the high refractive-index regions (2a) within the DLC film can readily be formed by irradiating it with an energy beam (4) such as an ion beam.

4 Claims, 8 Drawing Sheets

FOREIGN PATENT DOCUMENTS

| | | | |
|---|---|---|---|
| JP | 2000-066023 | A | 3/2000 |
| JP | 2000-185944 | | 7/2000 |
| JP | 2000-185994 | A | 7/2000 |
| JP | 2002-090534 | A | 3/2002 |

OTHER PUBLICATIONS

Q. Zhang et al., "Effects of hight energetic He+ ion irradiation on the structure of polymeric hydrogenated amorphous carbon," Microelectronics Journal, 1999, vol. 30, pp. 801-805.

Q. Zhang et al., "Structural modification of polymeric amorphous hydrogenated carbon films induced by high energetic He+ irradiation and thermal annealing," Diamond and Relatted Materials, 2000, vol. 9, pp. 1758-1761.

T. Glaser et al., "Diffractive optical isolater made of high-efficiency dielectric gratings only," Applied Optics, vol. 41, No. 18, Jun. 20, 2002, pp. 3558-3566.

T. Glaser et al., "Experimental realization of a diffractive optical isolator," SPIE, vol. 4179 (2000), pp. 158-167.

\* cited by examiner

DIFFRACTIVE OPTICAL ELEMENT AND METHOD OF ITS FORMATION

CROSS-REFERENCE TO RELATED APPLICATIONS

The present application is the United States National Stage entry of PCT International Application No. PCT/JP2003/010722, filed Aug. 25, 2003, which in turn claims priority to Japanese Patent Application No. 2002-273561, filed Sep. 19, 2002.

TECHNICAL FIELD

The present invention relates to diffractive optical elements and methods of their formation, and more particularly, to diffractive optical elements having wavelength-division multiplexing/demultiplexing, power-splitting/combining, polarization-division multiplexing/demultiplexing, wave-plate, or optical-isolator functionality, and to methods of forming such diffractive optical elements.

BACKGROUND ART

As is widely known, diffractive optical elements that produce diffraction of light can be employed in a variety of applications. For example, wavelength-division multiplexers, optical couplers, optical isolators, and like devices used in optical communications fields can be manufactured employing diffractive optical elements.

Diffractive optical elements generally are manufactured by forming a diffraction-grating layer on a transparent substrate. Diffractive optical elements are grossly divided, based on structural differences in the diffraction-grating layer, into refractive-index-modulated and surface-relief types.

Figure 19:
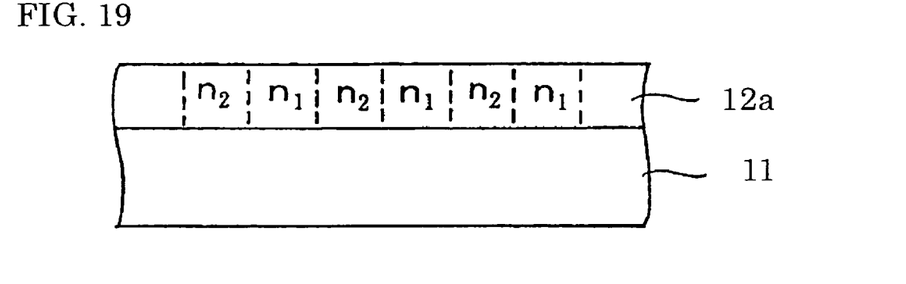
FIG. 19 is a schematic sectional view representing an example of a conventional refractive-index-modulated type of diffractive optical element.

FIG. 19 depicts, in a schematic sectional view, an example of a refractive-index-modulated type of diffractive optical element. This refractive-index-modulated optical element includes a diffraction-grating layer 12a formed on a transparent substrate 11, wherein a refractive-index modulated structure has been created in the diffraction-grating layer 12a. In particular, local regions having a relatively small refractive index $n_1$ and local regions having a relatively large refractive index $n_2$ are periodically formed in alternation in the diffraction-grating layer 12a. This enables the occurrence of a diffraction phenomenon originating in the phase difference that arises between light passing through the regions of low refractive index $n_1$ and light passing through the regions of high refractive index $n_2$.

The diffraction-grating layer 12a having the refractive-index modulated structure can be formed utilizing for example a material whose refractive index is increased by the material undergoing energy-beam irradiation. For instance, increasing the refractive index of Ge-doped quartz glass by means of ultraviolet irradiation is known. Likewise, irradiating quartz glass with X-rays to increase the refractive index of the glass is known. Accordingly, a diffraction-grating layer 12a as illustrated in FIG. 19 can be created by depositing a quartz-glass layer of refractive index $n_1$ onto a transparent substrate 11 and irradiating the glass layer with an energy beam in a periodic pattern to raise the refractive index locally to $n_2$.

Figure 20:
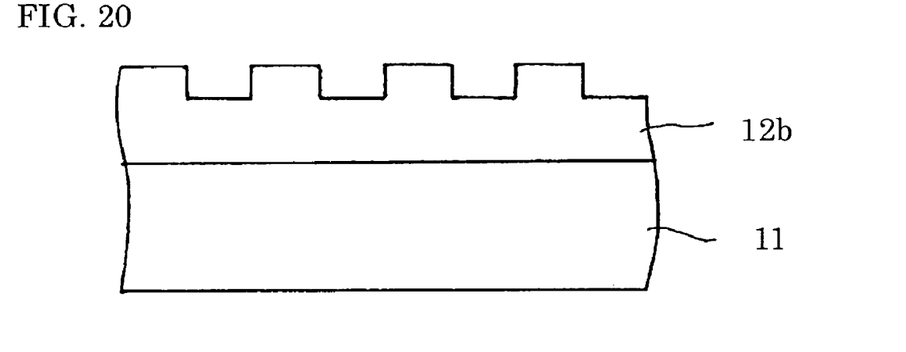
FIG. 20 is a schematic sectional view illustrating an example of a conventional surface-relief type of diffractive optical element.

FIG. 20 illustrates, in a schematic sectional view, an example of a surface-relief type of diffractive optical element. This surface-relief optical element includes a diffraction-grating layer 12b formed on a transparent substrate 11, wherein a relief structure has been embossed in the diffraction-grating layer 12b. In particular, local regions having a relatively large thickness and local regions having a relatively small thickness are periodically formed in alternation in the diffraction-grating layer 12b. This enables the occurrence of a diffraction phenomenon originating in the phase difference that arises between light passing through the regions of large thickness and light passing through the regions of small thickness.

The diffraction-grating layer 12b having the surface-relief structure can be formed by for example depositing a quartz glass layer onto a transparent substrate 11 and employing photolithography and etching to process the glass layer.

Figure 21:
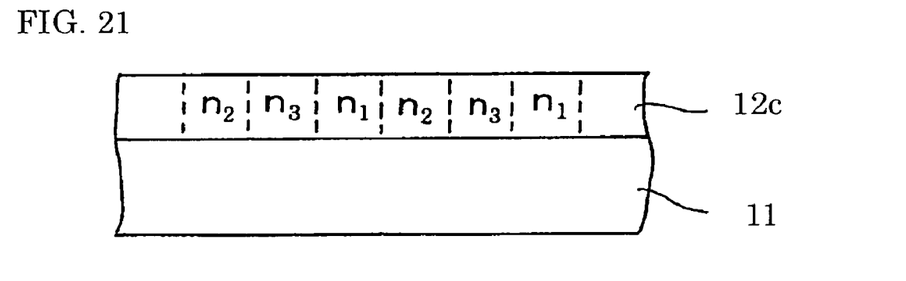
FIG. 21 is a schematic sectional view representing one more example of a conventional refractive-index-modulated type of diffractive optical element.

FIG. 21 depicts, in a schematic sectional view, one more example of a refractive-index-modulated type of diffractive optical element. The refractive-index-modulated optical element of FIG. 21 resembles that of FIG. 19, but within a diffraction-grating layer 12c in FIG. 21 local regions having refractive indices $n_1$, $n_2$, $n_3$ in three levels that differ from each other are arrayed periodically. Local regions in this way having refractive indices $n_1$, $n_2$, $n_3$ in three levels can be formed within a diffraction-grating layer 12c by for example depositing onto a substrate 11 a quartz glass layer of refractive index $n_1$ and irradiating the glass layer with an energy beam having two different energy levels.

By means of a diffraction grating that contains local regions whose refractive indices are multi-level, diffraction efficiency can be improved by comparison to the case with a diffraction grating that contains regions whose refractive indices are binary. In turn, as will be presumed from the fact that a diffraction grating that includes multi-level variation in refractive index can have high diffraction efficiency compared with a diffraction grating that contains binary variation in refractive index, a diffraction grating that includes continuous variation in refractive index instead of stepwise variation in refractive index can also have high diffraction efficiency compared with a diffraction grating that contains binary variation in refractive index. "Diffraction efficiency" herein means the ratio of the sum of the diffracted light energies to the energy of the incident light. This means that from the perspective of putting diffracted light to use, greater diffraction efficiency is to be preferred.

Figure 22:
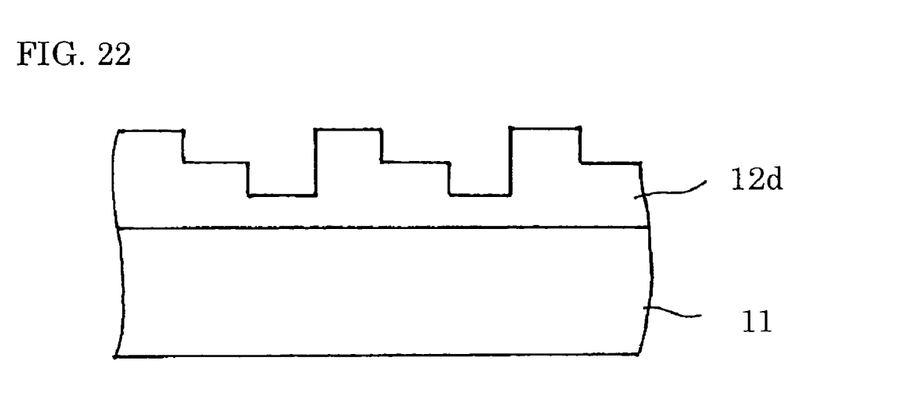
FIG. 22 is a schematic sectional view illustrating one more example of a conventional surface-relief type of diffractive optical element.

FIG. 22 represents, in a schematic sectional view, one more example of a surface-relief type of diffractive optical element. The surface-relief optical element of FIG. 22 resembles that of FIG. 20, but within a diffraction-grating layer 12d in FIG. 22 local regions having thicknesses in three levels that differ from each other are arrayed periodically. Local regions in this way having refractive thicknesses in three levels can be formed within a diffraction-grating layer 12d by for example depositing onto a substrate 11 a quartz glass layer and repeating a photolithographic and etching process on the glass layer two times. Thus by means of a diffraction grating that contains local regions having multi-level thicknesses, diffraction efficiency can be improved by comparison to the case with a diffraction grating that contains simple binary thicknesses.

Although diffractive optical elements of the refractive-index-modulated type described above are manufacturable in principle, in practice producing refractive-index-modulated diffractive optical elements is problematic. The reason is because with the amount of refractive-index variation obtained by irradiating for example quartz glass with an energy beam being at the very most 0.002 or so, creating an effective diffraction-grating layer is difficult.

Consequently, the general practice at present is—as set forth for example in Patent Reference 1, Japanese Unexamined Pat. App. Pub. No. S61-213802, and in Non-Patent Reference 1, *Applied Optics*, Vol. 41, 2002, pp. 3558-3566—to employ surface-relief types as diffractive optical elements. Nevertheless, the photolithography and etching necessary for fabricating relief diffractive optical elements are considerably complex manufacturing processes requiring a fair amount of time and trouble, besides which controlling the etching depth with precision is no easy matter. What is more, a problem with surface-relief diffractive optical elements is that since microscopic corrugations are formed in the element face, dust and dirt are liable to adhere.

DISCLOSURE OF INVENTION

An object of the present invention, in view of the situation as in the foregoing with prior technology, is to make available practical diffractive optical elements, efficiently and at low cost.

Patent Reference 1
  Japanese Unexamined Pat. App. Pub. No. S61-213802.

Non-Patent Reference 1
  *Applied Optics*, Vol. 41, 2002, pp. 3558-3566.

A diffractive optical element in accordance with the present invention is characterized in including a transparent DLC (diamond-like carbon) film formed onto a transparent substrate, with the DLC film including a diffraction grating containing local regions of relatively high refractive index and local regions of relatively low refractive index.

Here the boundary surface between these high-refractive-index regions and low-refractive-index regions may be perpendicular or may be at a slant to the face of the DLC film, and the refractive index along either side of the boundary surface may vary continuously.

A diffractive optical element of this sort makes it possible to divide a single light beam that includes a plurality of wavelengths into a plurality of beams depending on the wavelength, and is capable of functioning as a wavelength-division multiplexer/demultiplexer that makes it possible to unite into a unitary light beam a plurality of beams having different wavelengths.

A diffractive optical element as such also makes it possible to divide a beam of light of a single wavelength into a plurality of beams, and is capable of functioning as a power splitter/combiner that makes it possible to unite into a unitary light beam a plurality of single-wavelength beams.

Moreover, a diffractive optical element of this sort is capable of functioning as a polarization-division multiplexer/demultiplexer that makes it possible to separate and to unite TE waves and TM waves contained in a beam of light of a single wavelength.

A diffractive optical element as such is also capable of functioning as a wave plate with respect to TE waves and TM waves contained in a single-wavelength light beam.

In addition, combining a DLC film that includes a diffraction grating functioning as an above-described polarization-division multiplexer/demultiplexer with a DLC film that includes a diffraction grating functioning as a wave plate makes it possible to produce an optical isolator.

Furthermore, a diffractive optical element as such can include the diffraction grating being functional with respect to light that contains wavelengths within a range of from 0.8 μm to 2.0 μm.

In a method according to the present invention for forming a diffractive optical element as related above, the high refractive-index regions contained in the diffraction grating can be created by irradiating the DLC film(s) in a predetermined pattern with an energy beam to raise the film's refractive index. The energy beam can be chosen from X rays, electron beams, or ion beams, and the DLC film(s) can be deposited onto the substrate(s) by a plasma CVD technique. Furthermore, in a case in which the boundary surface between the high refractive-index regions and low refractive-index regions is to be slanted with respect to the surface of the DLC film, the DLC film may be irradiated with the energy beam angled with respect to the film surface.

BEST MODE FOR CARRYING OUT THE INVENTION

Embodiment 1

Figure 1:
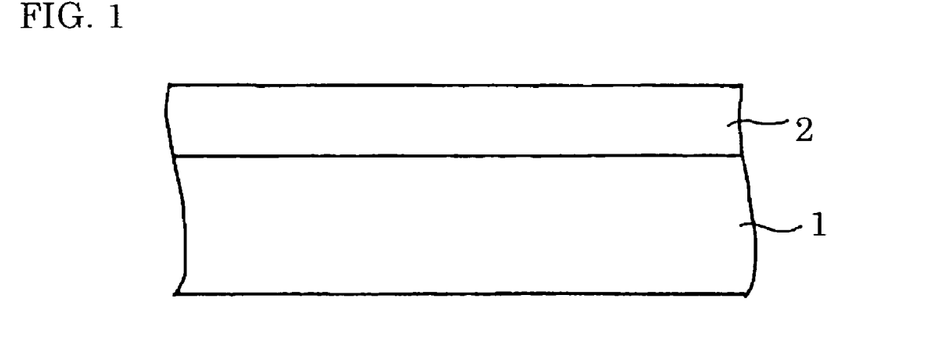
FIG. 1 is a schematic sectional view depicting a stage in manufacturing a diffractive optical element according to the present invention.
Figure 2:
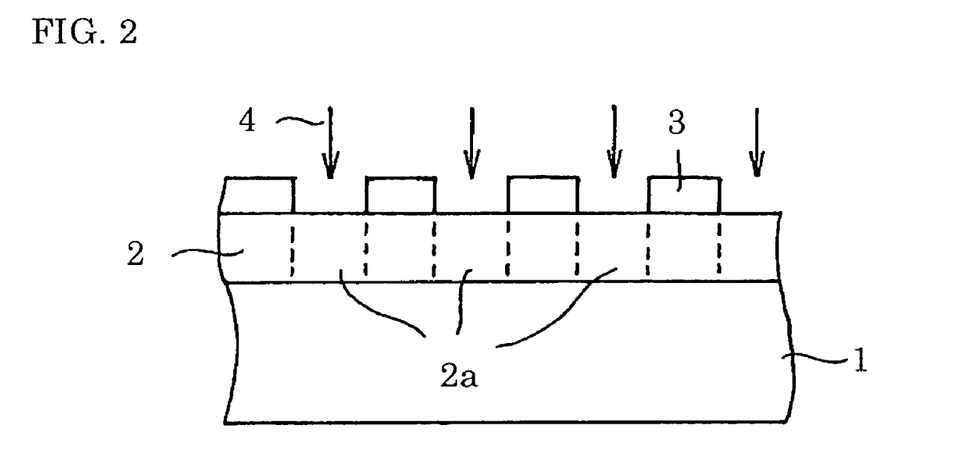
FIG. 2 is a schematic sectional view depicting a stage in manufacturing a diffractive optical element according to the present invention.
Figure 3:
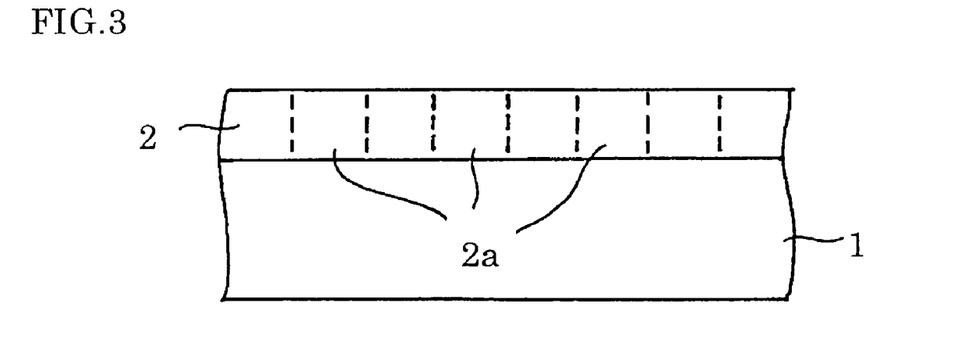
FIG. 3 is a schematic sectional view depicting a stage in manufacturing a diffractive optical element according to the present invention.

FIGS. 1 through 3 are schematic sectional views depicting a stage in the manufacture of a refractive-index-modulated diffractive optical element according to Embodiment 1 of the present invention. It should be understood that in the drawings for the present application, dimensional proportions such as length and thickness have been altered as appropriate in order to clarify and simplify the figures, and do not reflect the proportions in their actual relationships.

Onto an $SiO_2$ substrate 1, as represented in FIG. 1, having a 1.44 refractive index and having a 5 mm×5 mm principal face, a DLC film 2 was deposited by plasma CVD to a thickness of 2 μm. It will be appreciated the thickness of the DLC film in the refractive-index-modulated diffractive optical element is not particularly limited, and can be set to a thickness of choice. Nevertheless, it would be disadvantageous if the DLC film were too thick, in that the light-absorbing efficacy through the film would grow too great. By the same token, it would be disadvantageous if the DLC film were too thin, since gaining adequate diffractive effectiveness would likely prove to be problematic. With currently usable DLC films, to be employed in refractive-index-modulated diffractive optical elements the DLC films preferably are within a thickness range of 0.5 to 10 μm. Nonetheless, if a DLC film having a smaller light-absorption coefficient is to be produced, a thicker DLC film could be utilized; and if the rate of variation in refractive index is to be made larger, a thinner DLC film could be utilized.

A gold mask 3 in FIG. 2 was formed onto the DLC film 2 by a lift-off technique. In the gold mask 3, gold stripes of 0.5 μm width and 5 mm length were arrayed in iterations at a pitch of 0.5 μm. That is, the gold mask 3 had a "line & space" pattern. The DLC film 2 was thereafter implanted in an orthogonal direction through the apertures in the gold mask 3 with an He ion beam 4 at a dose of $5 \times 10^{17}/cm^2$ under an 800-keV acceleration voltage.

As a result, the regions within the DLC film that were not implanted with He ions had a refractive index of 1.55, while the refractive index of the regions 2a that were implanted with He ions was raised to 2.05. Such refractive-index variation in a DLC film was far larger by comparison to refractive-index variation that can be produced in quartz glass, enabling a diffraction-grating layer of sufficiently large diffraction efficiency to be created.

In FIG. 3, etching removal of the gold mask 3 has yielded the refractive-index-modulated diffractive optical element of Embodiment 1. It will be appreciated that the diffraction-grating layer 2 in this diffractive optical element contains regions of two types—refractive index 1.55 and 2.05—and thus is a so-called binary-level diffraction-grating layer.

Figure 4:
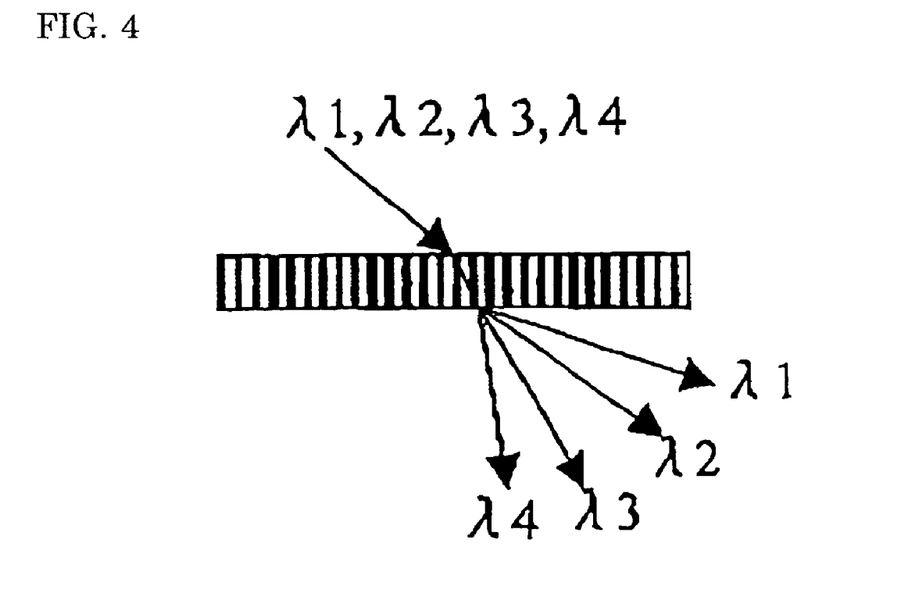
FIG. 4 is a schematic sectional view depicting the wavelength-demultiplexing action of a wavelength-division multiplexer/demultiplexer according to the present invention.

FIG. 4 depicts in a schematic sectional view wavelength-demultiplexing action in a situation in which the refractive-index-modulated diffractive optical element produced in Embodiment 1 was utilized as a wavelength-division multiplexer/demultiplexer. In this sectional drawing, the section areas in black represent regions of relatively high refractive index, while the section areas in white represent regions of relatively low refractive index. As is indicated in FIG. 4, if a single beam of light containing a plurality of wavelengths $\lambda_1$, $\lambda_2$, $\lambda_3$, $\lambda_4$, for example, is made incident onto the diffractive optical element, the diffraction angles of the beams that pass through the diffractive optical element differ from one another depending on the wavelength. This means that a single incident beam containing a plurality of wavelengths can be separated into a plurality of diffraction beams that wavelength by wavelength differ in advancing direction.

Of course, it should be evident that if the sense of the incident light beam and the diffraction beams indicated by the arrows in FIG. 4 is reversed, the diffractive optical element in FIG. 4 can be utilized as a wavelength multiplexer. It should be noted that in cases where the diffractive optical element is utilized as a wavelength demultiplexer, the light beam is generally made incident on the diffractive optical element at a suitable angle within a range of 0-70 degrees or so relative to a line normal to the element surface. The incident-angle range, however, depends on the angle that the boundaries between the high refractive-index regions and the low refractive-index regions form with the surface of the DLC film; in a case in which, for example, the high refractive-index regions have been formed in the surface of the DLC at a slant by diagonally directing an ion beam onto the DLC film face, the incident angle of the light beam would be adjusted taking the angle of slant into consideration.

Figure 5:
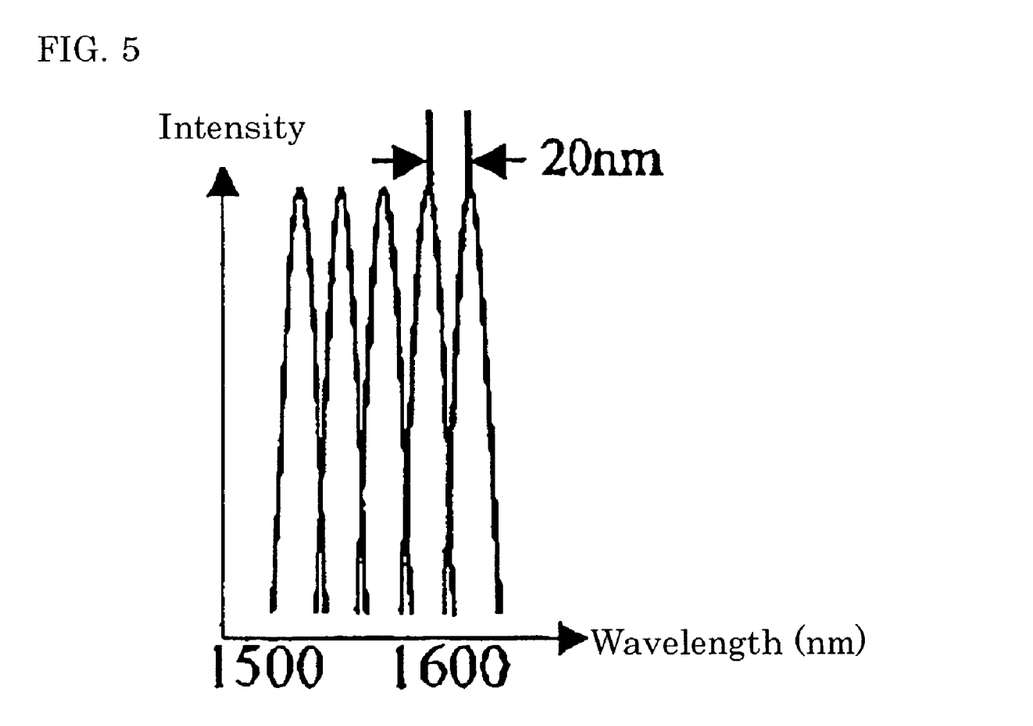
FIG. 5 is a graph showing the relationship between wavelength and intensity distribution of light demultiplexed by the wavelength-division multiplexer/demultiplexer according to the present invention.

FIG. 5 is a graph schematically representing an example of the results of wavelength demultiplexing by the refractive-index-modulated diffractive optical element of Embodiment 1. The horizontal axis in the graph represents diffraction-light wavelength (nm) while the vertical axis represents the diffraction-light intensity in arbitrary units. In this case, an optical fiber and a collimator were employed to direct light having a wavelength range of 1.5 to 1.6 μm and a beam diameter of 350 μm onto the diffractive optical element of Embodiment 1. As a result, five diffraction beams having wavelengths distributed at 20-nm intervals in a spectrum from 1.5 μm to 1.6 μm as shown in FIG. 5 were produced, with the five diffraction beams having approximately equal intensity. And with the diffraction efficiency in that case then being nearly 99%, quite outstanding wavelength demultiplexing properties were achieved.

It should be understood that in Embodiment 1, because a linear, one-dimensional diffraction grating pattern is utilized the diffraction beam is present lying in a single plane that contains the incident beam. Nevertheless, by utilizing a two-dimensional diffraction grating pattern—as in Embodiment 2, which will be set forth next—the diffraction beam can of course be distributed two-dimensionally.

Embodiment 2

Figure 6:
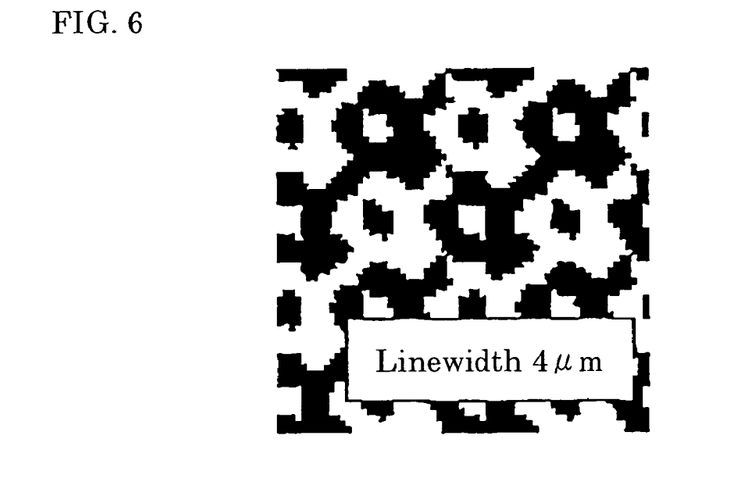
FIG. 6 is a schematic plan view showing an example of a diffraction-grating pattern in an optical power splitter according to the present invention.

FIG. 6 shows, in a schematic plan view, a two-dimensional diffraction-grating pattern in a diffractive optical element according to Embodiment 2. The diffractive optical element of Embodiment 2 can be fabricated by a manufacturing process likewise as was the case with Embodiment 1. In particular, the black regions in FIG. 6 represent where within the DLC film the refractive index was raised by irradiating the regions with the He ion beam, while the white areas represent regions that were not irradiated with the He ion beam. The black pattern was formed by combining 4 μm×4 μm microcells, and therein had a periodicity of 132 μm. This means that the minimum linewidth in the diffraction-grating pattern illustrated in FIG. 6 is 4 μm.

Figure 7:
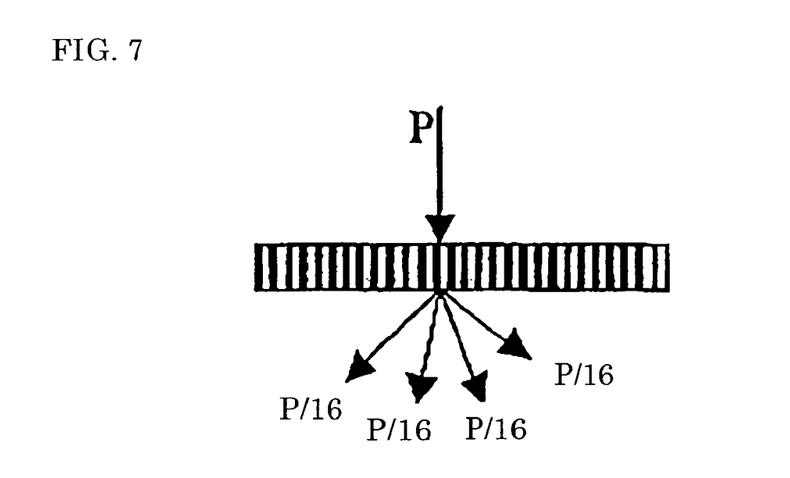
FIG. 7 is a schematic sectional view depicting the power-splitting action in an optical power splitter according to the present invention.

FIG. 7 depicts, in a schematic sectional view, power-splitting action in a case in which the refractive-index-modulated diffractive optical element produced in Embodiment 2 is employed as an optical coupler (power splitting device). In particular, if a beam of light of a single wavelength is made incident on the diffractive optical element, the diffraction angle of the beams that pass through the diffractive optical element differ from one another depending on the order of diffraction. Consequently, an incident beam of a single wavelength can be separated into a plurality of light-diffraction beams.

Figure 8:
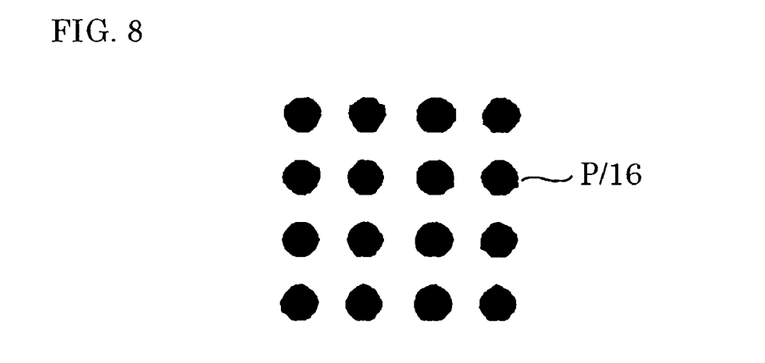
FIG. 8 is a plan view showing the beam distribution within a plane intersecting a diffraction beam having been power-split by the optical power splitter of FIG. 6.

FIG. 8 is a plan view representing beam distribution within a plane orthogonal to a diffraction beam having been power-split, as in FIG. 7, by the optical coupler of FIG. 6. More specifically, an incident beam having power P can be split into 16 diffraction beams each having power P/16. In an actual instance, light of 350 μm beam diameter, having a wavelength of 1.55 μm, was directed perpendicularly onto the surface of the diffractive optical element of Embodiment 2, wherein diffraction beams in 16 splits distributed in four-fold symmetry were produced.

It will be appreciated that a diffraction-grating pattern of FIG. 6 that can realize a diffraction-beam distribution pattern as shown in FIG. 8 can be found using a Fourier transform as is widely known.

Embodiment 3

In Embodiment 3, a diffractive optical element having polarization-division multiplexing/demultiplexing functionality was fabricated. With the diffractive optical element of Embodiment 3 as well, a DLC diffraction-grating layer having a "line & space" pattern was formed by a manufacturing process likewise as was the case with Embodiment 1. In Embodiment 3, however, high refractive-index regions of 0.4 μm width and 5 mm length were arrayed in iterations at a pitch of 0.4 μm.

Figure 9:
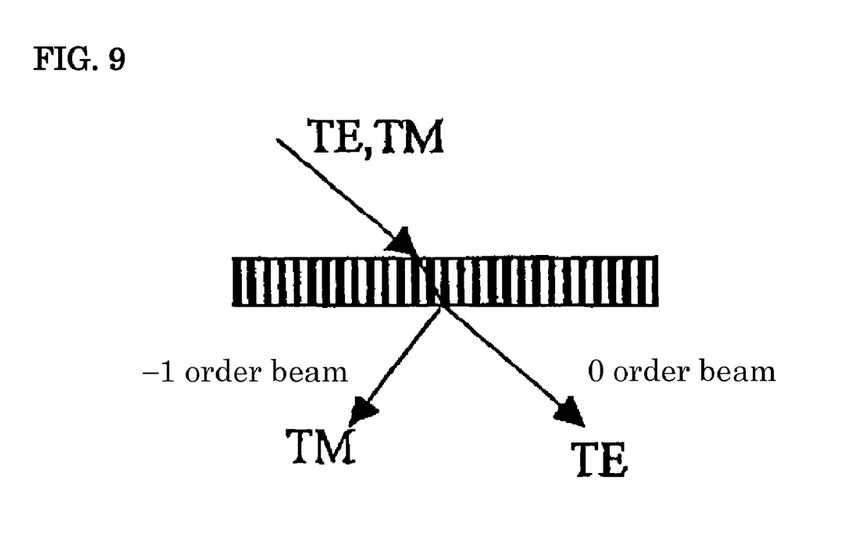
FIG. 9 is a schematic sectional view depicting the polarization-demultiplexing action in a polarization demultiplexer according to the present invention.

FIG. 9 depicts in a schematic sectional view polarization-demultiplexing action in case in which the refractive-index-modulated diffractive optical element produced in Embodiment 3 was employed as a polarization-division multiplexer/demultiplexer. In particular, if a TEM wave including a TE component and a TM component is made incident on the diffractive optical element of Embodiment 3, the TE wave and the TM wave will, depending on the difference in polarization between them, be diffracted at diffraction angles that differ from each other. For example, as illustrated in FIG. 9, the TE wave is obtained as a 0 order diffraction beam, while the TM wave is obtained as a −1 order diffraction beam. The splitting off of TE and TM waves is in this way made possible. In an actual instance, light of 100 μm beam diameter, having a wavelength of 1.55 μm, was made incident on the diffractive optical element of Embodiment 3, wherein TE and TM waves could be split off.

Embodiment 4

In Embodiment 4, a diffractive optical element having wave-plate functionality was fabricated. With the diffractive optical element of Embodiment 4 as well, a DLC diffraction-grating layer having a "line & space" pattern was formed by a manufacturing process likewise as was the case with Embodiment 1. In Embodiment 4, however, high refractive-index regions of 0.2 μm width and 5 mm length were arrayed in iterations at a pitch of 0.2 μm.

Figure 10:
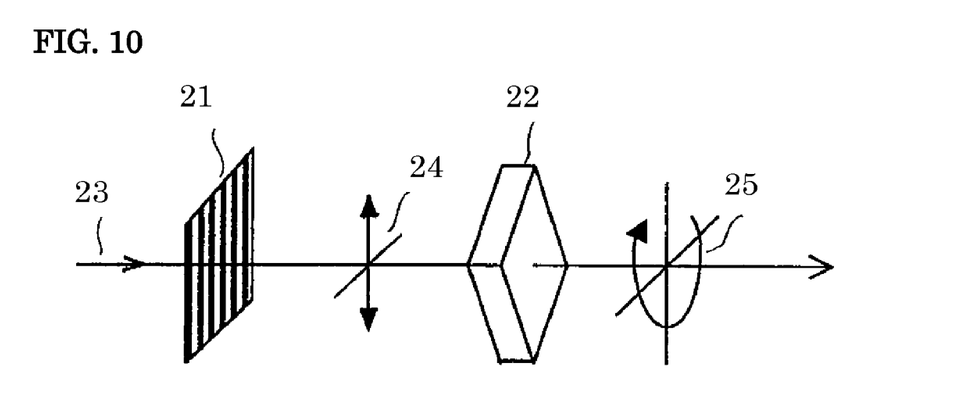
FIG. 10 is a schematic oblique view depicting the polarization conversion action in a wave plate according to the present invention.

FIG. 10 depicts in a schematic oblique view polarization conversion action in a case in which the refractive-index-modulated diffractive optical element produced in Embodiment 4 was employed as a wave plate. In the figure, a linear polarizing filter 21 and a diffractive optical element 22 in Embodiment 4, functioning as a quarter-wave plate, are arranged along the beam-advancing direction. The polarizing filter 21 allows only perpendicular linearly polarized light 24 within an incident beam 23 having a cross-sectional diameter of 350 μm and a wavelength of 1.55 μm to pass through. The line-and-space orientation of the high refractive-index regions contained in the diffractive optical element 22 has been rotated at a 45-degree angle with respect to the polarization direction of the linear polarized light 24. In an arrangement of this sort, light 25 having passed through the diffractive optical element 22 becomes circularly polarized light that rotates counterclockwise heading in the advancing direction.

Figure 11:
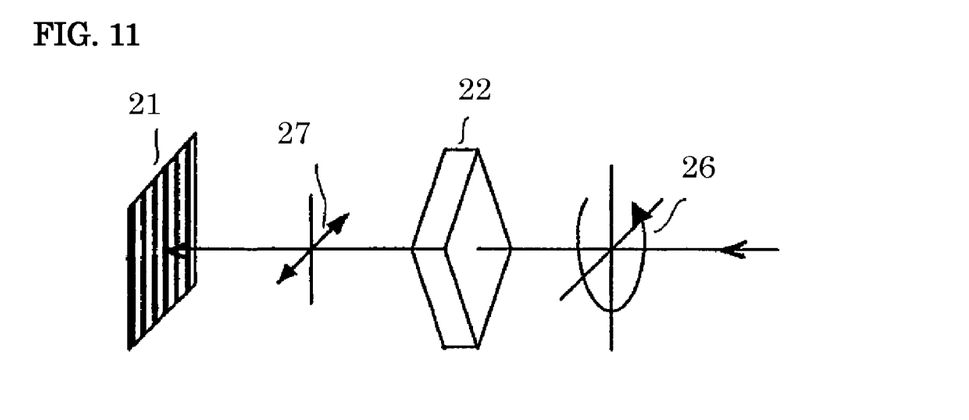
FIG. 11 is a schematic oblique view depicting action as an optical isolator in the optical system of FIG. 10.

FIG. 11 depicts a situation in which the polarizing filter 21 and the quarter-wave plate 22 function as an optical isolator. More specifically, once the circularly the polarized light 25 in FIG. 10 has reflected off some object and come back, it becomes return light 26 in which, owing to the reflection, the rotational direction of the circularly polarized light has been reverse-rotated. Then the return light 26, by passing through the quarter-wave plate 22 in the reverse direction, is converted into horizontal linearly polarized light 27. Thus, because the polarizing filter 21 allows only perpendicular linearly polarized light to pass through, the horizontal linearly polarized return light 27 is blocked by the polarizing filter 21, and cannot return to the light-incident end of the isolator. In this way operation as an optical isolator was demonstrable.

Embodiment 5

Figure 12:
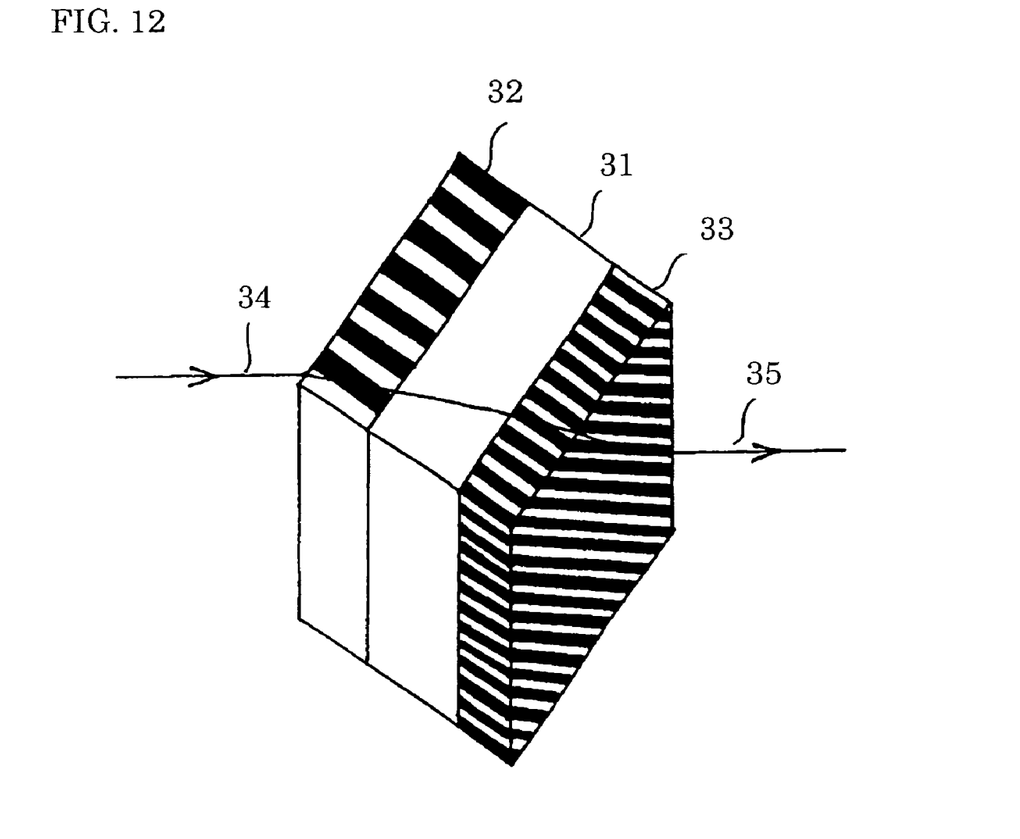
FIG. 12 is a schematic oblique view depicting a diffractive optical element that in the present invention is capable of operating as an optical isolator.

In Embodiment 5, as illustrated in the schematic oblique view of FIG. 12 a diffractive optical element having optical-isolator functionality was fabricated. In this diffractive optical element a first DLC film 32 was formed onto a first principal face of a quartz substrate 31, and a second DLC film 33 was formed onto the second principal face. Then the same diffraction grating as in Embodiment 3 was formed on the first DLC film 32, and the same diffraction grating as in Embodiment 4 was formed on the second DLC film 33.

A beam of light 34 of 350 μm cross-sectional diameter and 1.55 μm wavelength was made incident on the diffractive optical element of FIG. 12, wherein though light 35 having passed through the first diffraction-grating layer 32, functioning as a polarization demultiplexer, and the second diffraction optics layer 33, functioning as a quarter-wave plate, reflected off some object and came back, it could not pass through the quarter-wave plate 33 and the polarization demultiplexer 32, collaborating as an optical isolator, and return. As the extinction ratio in that instance—being the ratio of the intensity of the incident light relative to the intensity of the return light that passed through the first diffraction-grating layer 32—a value of over 40 dB was obtained.

Embodiment 6

Figure 13:
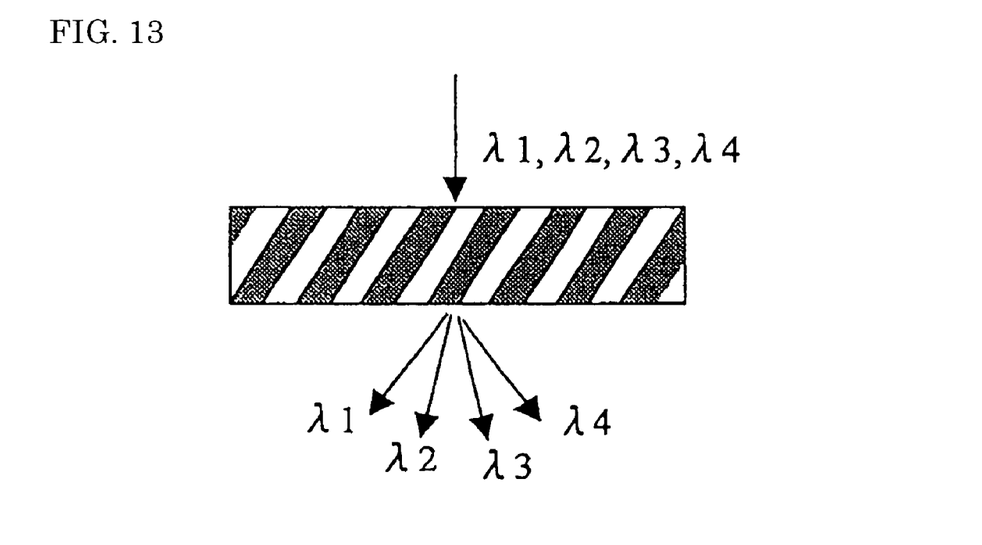
FIG. 13 is a schematic sectional view depicting another example of the wavelength-demultiplexing action of a wavelength-division multiplexer/demultiplexer according to the present invention.

A wavelength-division multiplexing/demultiplexing grating layer in Embodiment 6, represented in FIG. 13, resembles what is illustrated in FIG. 4, but is different in that the boundary surface between the high refractive-index regions and low refractive-index regions is slanted with respect to the surface of the DLC film. In fabricating the refractive-index-modulated diffraction optics layer of FIG. 13, similar to the case with Embodiment 1, onto an $SiO_2$ substrate having a 1.44 refractive index and having a 5 mm×5 mm principal face, a DLC film 2 was deposited by plasma CVD to a thickness of 5 μm.

A gold mask having a line-&-stripe pattern in which gold stripes of 0.5 μm width and 5 mm length were arrayed in iterations at a pitch of 1 μm was formed onto the DLC film. The DLC film was thereafter implanted through the apertures in the gold mask, at a slant angle of 40 degrees with respect to the film surface and in a direction at right angles to the lengthwise orientation of the gold stripes, with an He ion beam 4 at a dose of $5 \times 10^{17}/cm^2$ under an 800-keV acceleration voltage. As a result, the regions within the DLC film that were not implanted with He ions had a refractive index of 1.55, while the refractive index of the regions 2a that were implanted with He ions was raised to 2.05.

FIG. 13, resembling FIG. 4, depicts in a schematic sectional view the wavelength-demultiplexing action in a situation in which the refractive-index-modulated diffractive optics layer produced in Embodiment 6 was utilized as a wavelength-division multiplexer/demultiplexer. As is indicated in FIG. 13, if a single beam of light containing a plurality of wavelengths $\lambda_1, \lambda_2, \lambda_3, \lambda_4$, for example, is made incident onto the diffractive optical element, the diffraction angles of the beams that pass through the diffractive optical element differ from one another depending on the wavelength. This means that a single incident beam containing a plurality of wavelengths can be separated into a plurality of diffraction beams that wavelength by wavelength differ in advancing direction.

In the Embodiment 6 case, an optical fiber and a collimator were employed to direct light, having a wavelength range of 1.5 to 1.6 μm and a beam diameter of 350 μm, onto the diffractive optical element of FIG. 13 in a direction at right angles to the surface. As a result, five diffraction beams having wavelengths distributed at 20-nm intervals in a spectrum from 1.5 μm to 1.6 μm as shown in FIG. 5 were produced, likewise as was the case in Embodiment 1, with the five diffraction beams having approximately equal intensity. And with the diffraction efficiency in that case then being nearly 99%, quite outstanding wavelength demultiplexing properties were achieved.

It will be appreciated that being able, as in the present Embodiment 6, to introduce incident light in a direction running straight through the surface of the diffractive optics layer contributes further toward size and cost reduction of optical components that include a diffractive optics layer, and enables simplifying alignment processes in packaging the diffractive optical element as an optical component.

Embodiment 7

Figure 14:
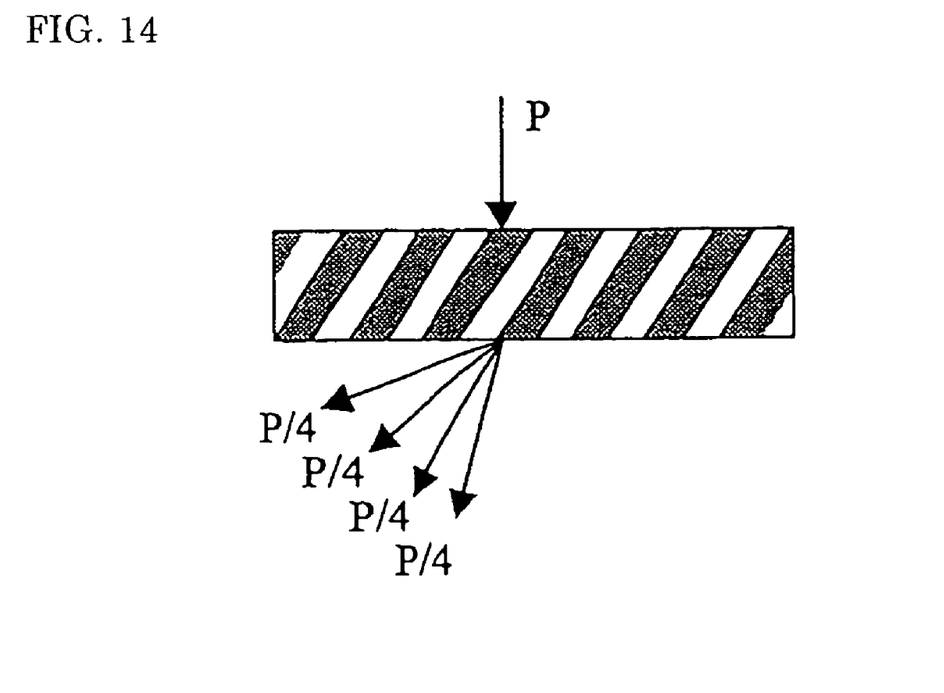
FIG. 14 is a schematic sectional view depicting another example of the power-splitting action in an optical power splitter according to the present invention.

In Embodiment 7, which is represented in FIG. 14, a power-splitting grating layer resembles what is shown in FIG. 7, but is different in that the boundary surface between the high refractive-index regions and low refractive-index regions is slanted, by 45 degrees for example, with respect to the surface of the DLC film. In addition, while the power-splitting grating layer of FIG. 7 has a two-dimensional diffraction grating pattern as illustrated in FIG. 6, with the power-splitting grating layer of FIG. 14, high refractive-index regions of for example 90 μm width are formed in the surface of the DLC film in a line-&-space pattern with a periodicity of 180 μm.

This means that in a case in which the boundary surface between the high refractive-index regions and low refractive-index regions is slanted with respect to the DLC film surface, while incident power cannot be spit two-dimensionally as indicated in FIG. 8, in a plane containing a light beam incident at right angles to the DLC film surface and orthogonal to the boundary surface between the high refractive-index regions and low refractive-index regions the incident light beam can be power-split into a plurality of beams.

Embodiment 8

Figure 15:
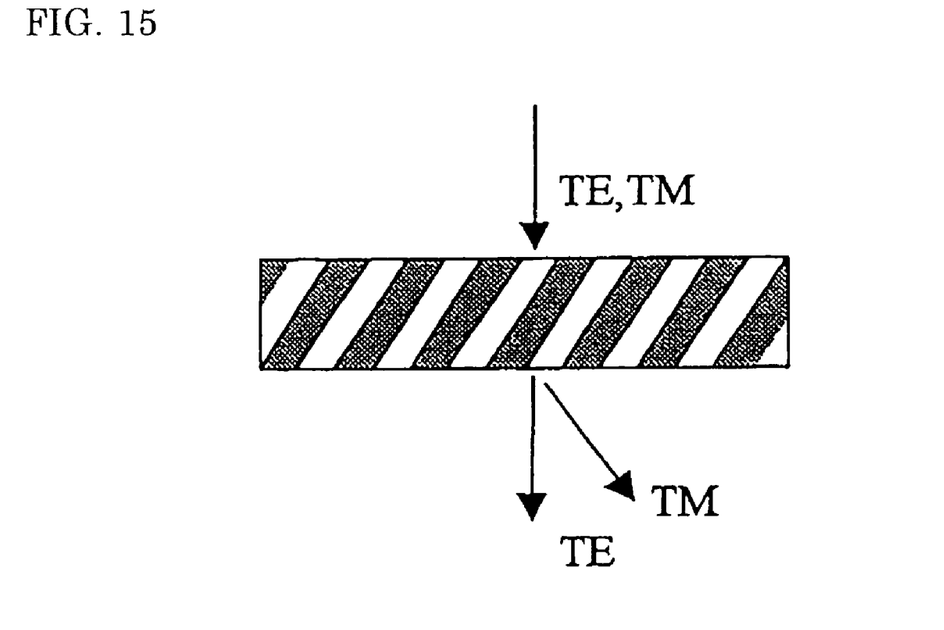
FIG. 15 is a schematic sectional view depicting another example of the polarization-demultiplexing action in a polarization demultiplexer according to the present invention.

In Embodiment 8, which is represented in FIG. 15, a polarization-separation grating layer resembles what is shown in FIG. 9, but is different in that the boundary surface between the high refractive-index regions and low refractive-index regions is slanted with respect to the surface of the DLC film. In this Embodiment 8, similar to the case with Embodiment 6, a DLC film 2 was deposited onto an $SiO_2$ substrate by plasma CVD to a thickness of 4 μm. A gold mask having a line-&-stripe pattern in which gold stripes of 0.4 μm width and 5 mm length were arrayed in iterations at a pitch of 1 μm was formed onto the DLC film. The DLC film was thereafter implanted with He ions at a slant angle of 40 degrees with respect to the film surface and in a direction at right angles to the lengthwise orientation of the gold stripes.

If a beam TEM waves including a TE component and a TM component is made incident on the diffractive optics layer of FIG. 15 in a direction running straight through its surface, the TE wave and the TM wave will, depending on the difference in polarization between them, be diffracted at diffraction angles that differ from each other. In an actual instance, light of 100 μm beam diameter, having a wavelength of 1.55 μm, was made incident on the diffractive optical element of present Embodiment 8, wherein TE and TM waves could be split off.

Embodiment 9

Figure 16:
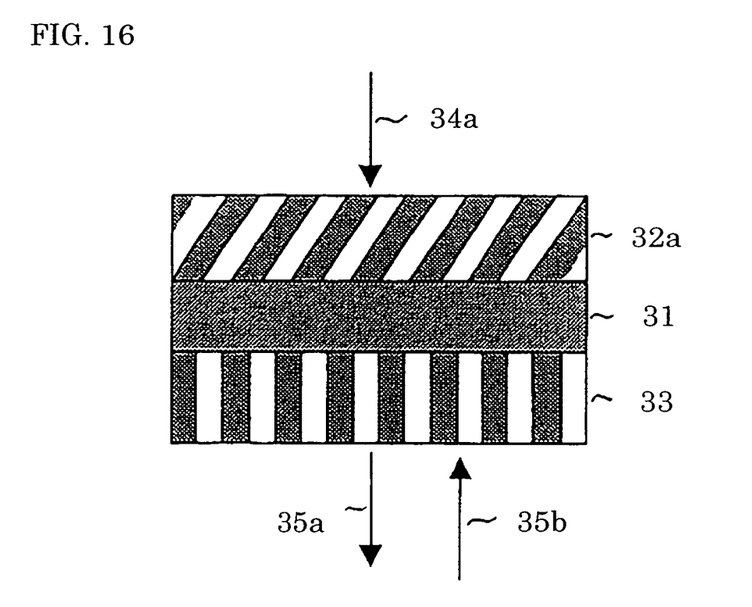
FIG. 16 is a schematic sectional view depicting another example of a diffractive optical element that in the present invention is capable of operating as an optical isolator.

In Embodiment 9, which is represented in the schematic sectional view of FIG. 16, an optical isolator resembles what is shown in FIG. 12, but is different in that the same diffraction grating as in FIG. 8 was formed in the first DLC film 32a contained in the isolator.

A light beam 34a of 350 μm cross-sectional diameter and 1.55 μm wavelength was made perpendicularly incident on the surface of the diffractive optical element of FIG. 16, wherein though light 35a having passed through the first diffraction-grating layer 32a, functioning as a polarization demultiplexer, and the second diffraction optics layer 33, functioning as a quarter-wave plate, reflected off some object and came back as reflected beam 35b, it could not pass through the quarter-wave plate 33 and the polarization demultiplexer 32a, collaborating as an optical isolator, and return.

Embodiment 10

Figure 17:
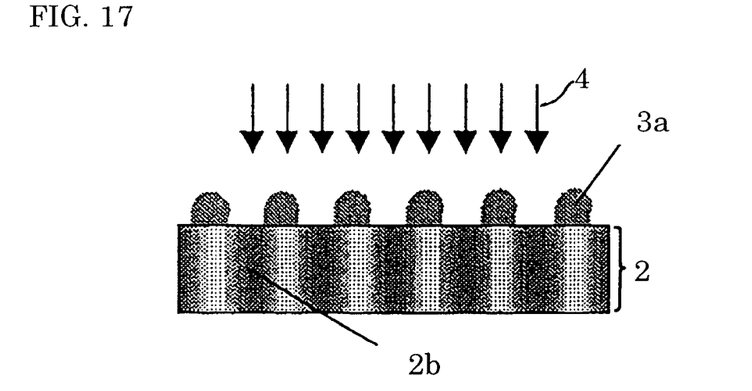
FIG. 17 is a schematic sectional view depicting another example of a method of manufacturing a diffractive optical element according to the present invention.

In Embodiment 10, another example of a method of creating a diffractive optical element according to the present invention is presented. In the schematic sectional view of FIG. 17, a plurality of linear gold masks 3a is formed on a DLC film 2. The linear gold masks 3a have a semicircular upper face in cross-section orthogonal to the lengthwise orientation. He ions 4 are irradiated from above the mask thus patterned, in a direction at right angles to the upper face of the DLC film 2, thus forming high refractive-index regions 2b within the DLC film 2.

Since in this situation each linear mask has a semicircular upper face, in proximity to the lateral faces of each mask some of the He ions can permeate the mask, which enables the permeating He ions to invade the DLC film 2 interior. Consequently, this means that within the DLC film 2 in FIG. 17 the refractive index varies continuously alongside the boundary surface between the high refractive-index regions and low refractive-index regions. Then in a refractive-index-modulated diffractive optical element thus having continuous refractive-index variation, diffraction efficiency made better by comparison to a diffractive optical element having binary refractive-index variation as described earlier can be produced.

Figure 18:
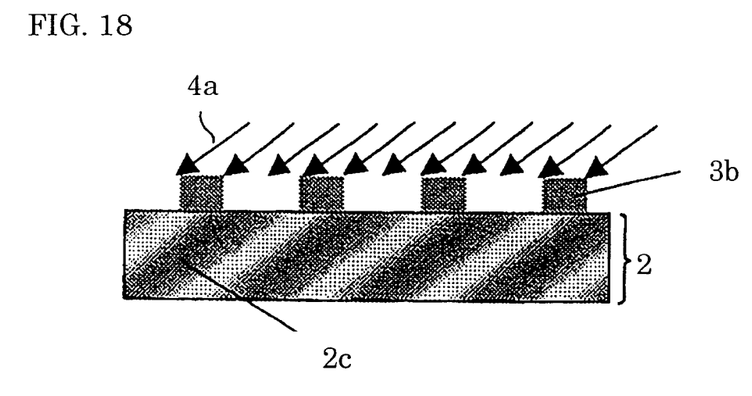
FIG. 18 is a schematic sectional view depicting yet another example of a method of manufacturing a diffractive optical element according to the present invention.

Meanwhile, in the schematic sectional view of FIG. 18, a plurality of linear gold masks 3b is formed on a DLC film 2. The linear gold masks 3b are rectangular in cross-section orthogonal to the lengthwise orientation and have considerable thickness. He ions 4 are irradiated from diagonally above the mask thus patterned, in a direction slanted with respect to the upper face of the DLC film 2, thus forming high refractive-index regions 2c within the DLC film 2.

In this situation, in proximity to the corners of the linear masks in rectangular cross section, some of the He ions can permeate the mask, which enables the permeating He ions to invade the DLC film 2 interior. Consequently, this enables slanting the boundary surface between the high refractive-index regions and low refractive-index regions within the DLC film 2 in FIG. 18, and means that alongside the boundary surface the refractive index varies continuously.

While in the foregoing embodiments examples in which He ion irradiation was employed to raise the refractive index of the DLC film were explained, it will be appreciated that X-ray irradiation or electron-beam irradiation for example can also be employed in order to raise the DLC film refractive index. Likewise, in the above-described embodiments explanation regarding incident light within a wavelength range of from 1.5 µm to 1.6 µm was made, but in the present invention diffractive optical elements that can be used for light having any sort of wavelength within the 0.8 µm to 2.0 µm range that is capable of being employed in optical communications fields can be manufactured.

Of course, multi-level diffraction gratings can, moreover, be formed within the DLC film. In that case, the DLC film may be irradiated with energy beams that differ in energy level and/or dose.

INDUSTRIAL APPLICABILITY

As given in the foregoing, the present invention enables practical diffractive optical elements to be made available efficiently and at low-cost. Moreover, in refractive-index-modulated diffractive optical elements made realizable by utilizing a DLC film, since microscopic corrugations are not present in the surface as with surface-relief diffractive optical elements, the surface is unlikely to be contaminated, and even if it is contaminated can be readily cleansed. What is more, a diffractive optical element of the present invention is advantageous from the perspective that because DLC films have high resistance to wear the element surface is not likely to be damaged.

The invention claimed is:

1. A diffractive optical element including first and second transparent diamond-like carbon (DLC) films formed respectively on the principal faces of first and second transparent substrates, each of said DLC films including a diffraction grating containing local regions of relatively high refractive index and local regions of relatively low refractive index, wherein:

said first DLC film has polarization demultiplexing functionality capable of polarization-separating TE waves and TM waves contained in a beam of light of a single wavelength;

said second DLC film has wave-plate functionality with respect to TE waves and TM waves contained in a beam of light of a single wavelength; and said first and second DLC films operate together to have optical-isolator functionality.

2. A diffractive optical element as set forth in claim 1, wherein the boundary surface between said high-refractive-index regions and said low-refractive-index regions in said first DLC film is slanted with respect to the face of the DLC film, and the boundary surface between said high-refractive-index regions and said low-refractive-index regions in said second DLC film is perpendicular with respect to the face of the DLC film.

3. A diffractive optical element as set forth in claim 2, wherein the refractive index along both sides of said boundary surface varies continuously.

4. A diffractive optical element as set forth in claim 1, wherein said diffraction grating is operational with respect to light that contains wavelengths within a range of from 0.8 µm to 2.0 µm.

* * * * *